(12) United States Patent
Lee

(10) Patent No.: US 12,185,015 B2
(45) Date of Patent: Dec. 31, 2024

(54) IMAGE PROCESSING DEVICE

(71) Applicant: eYs3D Microelectronics, Co., Taipei (TW)

(72) Inventor: Chi-Feng Lee, Hsinchu County (TW)

(73) Assignee: eYs3D Microelectronics, Co., Taipei (TW)

( * ) Notice: Subject to any disclaimer, the term of this patent is extended or adjusted under 35 U.S.C. 154(b) by 0 days.

(21) Appl. No.: 18/092,947

(22) Filed: Jan. 4, 2023

(65) Prior Publication Data
US 2023/0231965 A1 Jul. 20, 2023

Related U.S. Application Data

(62) Division of application No. 16/432,888, filed on Jun. 5, 2019, now Pat. No. 11,582,402.

(Continued)

(51) Int. Cl.
*G06T 5/70* (2024.01)
*G06T 7/00* (2017.01)
*G06T 7/80* (2017.01)
*H04N 5/262* (2006.01)
*H04N 13/15* (2018.01)
*H04N 13/161* (2018.01)
*H04N 13/204* (2018.01)
*H04N 13/239* (2018.01)
*H04N 13/254* (2018.01)
*H04N 13/296* (2018.01)
(Continued)

(52) U.S. Cl.
CPC ............ *H04N 5/2628* (2013.01); *G06T 5/70* (2024.01); *G06T 7/85* (2017.01); *G06T 7/97* (2017.01); *H04N 13/15* (2018.05); *H04N 13/161* (2018.05); *H04N 13/204* (2018.05); *H04N 13/239* (2018.05); *H04N 13/254* (2018.05); *H04N 13/296* (2018.05); *H04N 17/002* (2013.01); *H04N 23/698* (2023.01); *H04N 2201/3254* (2013.01); *H04N 2201/3277* (2013.01)

(58) Field of Classification Search
None
See application file for complete search history.

(56) References Cited

U.S. PATENT DOCUMENTS 4,988,984 A 1/1991 Gonzalez-Lopez
5,111,192 A 5/1992 Kadakia
(Continued)

FOREIGN PATENT DOCUMENTS

CN 103729883 A 4/2014
CN 105609087 A 5/2016
(Continued)

*Primary Examiner* — Tsung Yin Tsai
(74) *Attorney, Agent, or Firm* — Winston Hsu

(57) ABSTRACT

An image processing device includes a rotation processor and an image processor. The rotation processor receives an input image and generates a temporary image according to the input image. The image processor is coupled to the rotation processor and outputs a processed image according to the temporary image, wherein the image processor has a predetermined image processing width, a width of the input image is larger than the predetermined image processing width, and a width of the temporary image is less than the predetermined image processing width.

6 Claims, 4 Drawing Sheets

Related U.S. Application Data

(60) Provisional application No. 62/681,683, filed on Jun. 7, 2018.

(51) Int. Cl.
*H04N 17/00* (2006.01)
*H04N 23/698* (2023.01)

(56) References Cited

U.S. PATENT DOCUMENTS

| | | | | |
|---|---|---|---|---|
| 5,726,704 A * | 3/1998 | Uomori | | H04N 13/239 |
| | | | | 348/E13.052 |
| 5,986,672 A | 11/1999 | Groezinger | | |
| 6,028,795 A | 2/2000 | Kimura | | |
| 6,137,491 A | 10/2000 | Szeliski | | |
| 6,437,790 B1 | 8/2002 | Kimura | | |
| 6,563,535 B1 | 5/2003 | Anderson | | |
| 7,307,634 B2 | 12/2007 | Karlov | | |
| 7,535,474 B1 * | 5/2009 | Scholander | | G09G 5/39 |
| | | | | 345/531 |
| 7,643,038 B2 | 1/2010 | King | | |
| 7,876,977 B2 | 1/2011 | Walton | | |
| 7,965,776 B2 | 6/2011 | Kuroki | | |
| 7,995,867 B2 | 8/2011 | Walton | | |
| 8,587,807 B2 | 11/2013 | Matsuhira | | |
| 9,497,441 B2 * | 11/2016 | Myokan | | H04N 13/239 |
| 10,237,528 B2 * | 3/2019 | Tzur | | H04N 13/261 |
| 10,708,520 B2 * | 7/2020 | Lee | | H04N 5/2628 |
| 2003/0035001 A1 * | 2/2003 | Van Geest | | H04N 19/597 |
| | | | | 348/E13.058 |
| 2004/0008356 A1 | 1/2004 | Fujisawa | | |
| 2007/0024614 A1 * | 2/2007 | Tam | | H04N 13/282 |
| | | | | 348/E13.02 |
| 2010/0110492 A1 | 5/2010 | Matsuhira | | |
| 2010/0194886 A1 | 8/2010 | Asari | | |
| 2010/0295948 A1 | 11/2010 | Xie | | |
| 2011/0026042 A1 | 2/2011 | Cogan | | |
| 2011/0317988 A1 | 12/2011 | Lee | | |
| 2012/0274739 A1 | 11/2012 | Li | | |
| 2012/0315022 A1 * | 12/2012 | Nagasawa | | H04N 13/243 |
| | | | | 386/326 |
| 2013/0027584 A1 | 1/2013 | Zerwick | | |
| 2013/0077882 A1 | 3/2013 | Venkataraman | | |
| 2014/0168211 A1 * | 6/2014 | Kawada | | G06T 19/20 |
| | | | | 345/419 |
| 2014/0225985 A1 | 8/2014 | Klusza | | |
| 2014/0267602 A1 * | 9/2014 | Tzur | | H04N 13/383 |
| | | | | 348/43 |
| 2015/0213607 A1 | 7/2015 | Jeong | | |
| 2015/0314443 A1 | 11/2015 | Yu | | |
| 2016/0029009 A1 | 1/2016 | Lu | | |
| 2016/0089882 A1 | 3/2016 | Ishida | | |
| 2016/0219258 A1 * | 7/2016 | Woodgate | | H04N 23/661 |
| 2016/0291594 A1 | 10/2016 | Zhao | | |
| 2017/0010452 A1 | 1/2017 | Patzwald | | |
| 2017/0078644 A1 * | 3/2017 | Chen | | H04N 13/271 |
| 2017/0161561 A1 | 6/2017 | Marty | | |
| 2017/0372452 A1 | 12/2017 | Wang | | |
| 2018/0061021 A1 | 3/2018 | Lin | | |
| 2018/0139431 A1 * | 5/2018 | Simek | | H04N 13/271 |
| 2018/0278916 A1 | 9/2018 | Kim | | |
| 2019/0019476 A1 | 1/2019 | Ge | | |
| 2019/0259178 A1 | 8/2019 | Hafner | | |
| 2019/0378301 A1 * | 12/2019 | Lee | | H04N 13/204 |
| 2019/0379842 A1 * | 12/2019 | Lee | | G06T 7/97 |
| 2023/0231965 A1 * | 7/2023 | Lee | | H04N 13/204 |
| | | | | 348/583 |

FOREIGN PATENT DOCUMENTS

| | | |
|---|---|---|
| CN | 106416240 A | 2/2017 |
| CN | 106576160 A | 4/2017 |
| CN | 107167996 A | 9/2017 |
| TW | 201447228 A | 12/2014 |
| TW | 201733350 A | 9/2017 |

* cited by examiner (a)　　　　　　　　　(b)

(a)

(b)

IMAGE PROCESSING DEVICE

CROSS REFERENCE TO RELATED APPLICATIONS

This application is a division of U.S. application Ser. No. 16/432,888, filed on Jun. 5, 2019, which claims the benefit of U.S. Provisional Application No. 62/681,683, filed on Jun. 7, 2018. The contents of these applications are incorporated herein by reference.

BACKGROUND OF THE INVENTION

1. Field of the Invention

The present invention relates to an image processing device, and particularly to an image processing device that reduces width of an image applied to the image processing device.

2. Description of the Prior Art

An image processor usually has a restriction on a size of an input image due to a structure of the image processor. Specifically, the size of the input image is defined by a width and a height, and the restriction of the image processor limits the width of the input image to be equal to or less than a certain value. However, as image capturing technology improves, a resolution of the input image may become higher. Consequently, because the size of the input image may become larger, the width of the input image may exceed the restriction of the image processor, resulting in the input image not being applied to the image processor. Therefore, how to process the input image that exceeds the restriction of the image processor is an important issue for an image processor designer.

SUMMARY OF THE INVENTION

An embodiment of the present invention provides an image processing device. The image processing device includes a rotation processor and an image processor. The rotation processor receives an input image and generates a temporary image according to the input image. The image processor is coupled to the rotation processor and outputs a processed image according to the temporary image, wherein the image processor has a predetermined image processing width, a width of the input image is larger than the predetermined image processing width, and a width of the temporary image is less than the predetermined image processing width.

Another embodiment of the present invention provides an image processing device. The image processing device includes a rotation processor and a depth map generator. The rotation processor receives a left-eye processed image and a right-eye processed image and generates a left-eye temporary image and a right-eye temporary image according to the left-eye processed image and the right-eye processed image. The depth map generator is coupled to the rotation processor and outputs a depth map according to the left-eye temporary image and the right-eye temporary image, wherein the depth map generator has a predetermined image processing width, widths of the left-eye processed image and the right-eye processed image are larger than the predetermined image processing width respectively, and widths of the left-eye temporary image and the right-eye temporary image are less than the predetermined image processing width respectively.

The present invention provides an image processing device. The image processing device receives at least one image, and utilizes a rotation processor included in the image processing device to generate at least one temporary image according to the at least one image, or according to at least one processed image further generated according to the at least one image, wherein at least one width of the at least one image is larger than a predetermined image processing width defined by the image processing device, and at least one width of the at least one temporary image is less than the predetermined image processing width. Therefore, compared to the prior art, the present invention can process the at least one image even if the at least one width of the at least one image is larger than the predetermined image processing width defined by the image processing device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
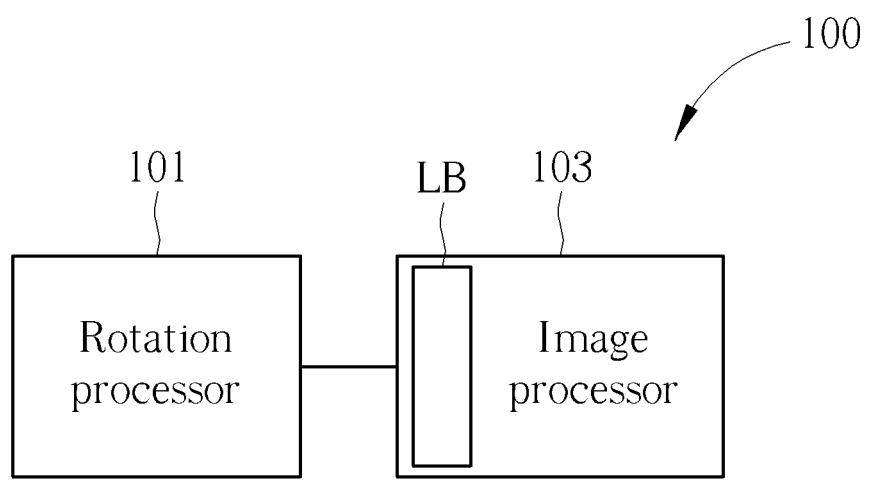
FIG. 1 is a diagram illustrating an image processing device according to a first embodiment of the present invention.

Please refer to FIG. 1. FIG. 1 is a diagram illustrating an image processing device 100 according to a first embodiment of the present invention. As shown in FIG. 1, the image processing device 100 includes a rotation processor 101 and an image processor 103, wherein the image processor 103 is coupled to the rotation processor 101, and the image processor 103 includes at least one line buffer LB. The rotation processor 101 can utilize an input interface thereof (not shown in FIG. 1) to receive an input image, wherein the input image is captured by an image capturer, and the input interface is a parallel interface, a MIPI interface, a SMIA interface, or other interface that can receive the input image. But, the present invention is not limited to the input image captured by the image capturer, that is, the rotation processor 101 can receive the input image via a storage device or other devices.

Figure 2:
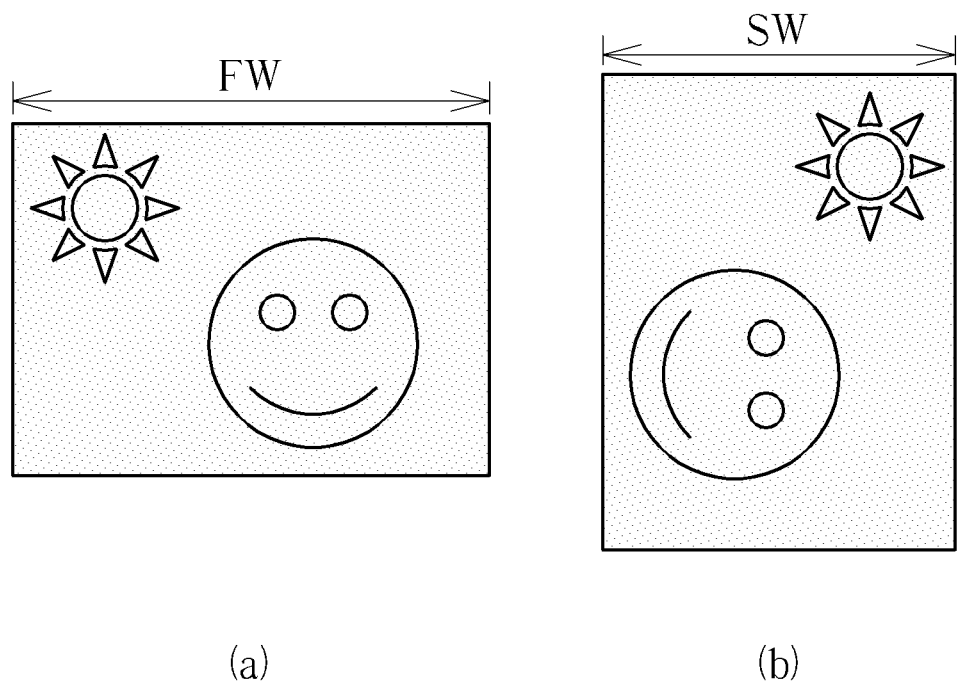
FIG. 2 is a diagram illustrating (a) the input image and (b) the temporary image.

Moreover, the rotation processor 101 includes a dynamic random-access memory (DRAM) (not shown in FIG. 1). After receiving the input image, the rotation processor 101 further utilizes the DRAM to rotate the input image 90 degrees either clockwise or counterclockwise to generate a temporary image. Please refer to FIG. 2. FIG. 2 is a diagram illustrating (a) the input image and (b) the temporary image. As shown in FIG. 2(a), 2(b), the input image has a first width FW and the temporary image has a second width SW.

Because the temporary image is generated by rotating the input image 90 degrees, the second width SW equals to a height of the input image. For example, assume that the input image has a size of 1920×1080 pixels. Then, the first width FW would be equal to 1920 pixels, the height of the input image would be equal to 1080 pixels, and after the rotation processor 101 rotates the input image 90 degrees, the second width SW would be also equal to 1080 pixels.

In addition, as shown in FIG. 1, the at least one line buffer LB is a static random-access memory (SRAM), which can be used for storing at least one line of image pixel data. Because a size of the SRAM is limited, a size of the at least one line buffer LB is also limited. However, the present invention is not limited to the at least one line buffer LB being the SRAM, that is, the at least one line buffer LB can be DRAM: or other type of memories. Therefore, the image processor 103 has a predetermined image processing width W corresponding to the size of the at least one line buffer LB, wherein the predetermined image processing width W limits a size of an image that the image processor 103 can receive. For example, take the predetermined image processing width W as 1280 pixels. Because the first width FW (e.g. 1920 pixels) is larger than the predetermined image processing width W (1280 pixels), the image processor 103 cannot receive the input image. However, after the rotation processor 101 rotates the input image 90 degrees and generates the temporary image, because the second width SW (e.g. 1080 pixels) is less than the predetermined image processing width W (1280 pixels), the image processor 103 can receive the temporary image.

Figure 3:
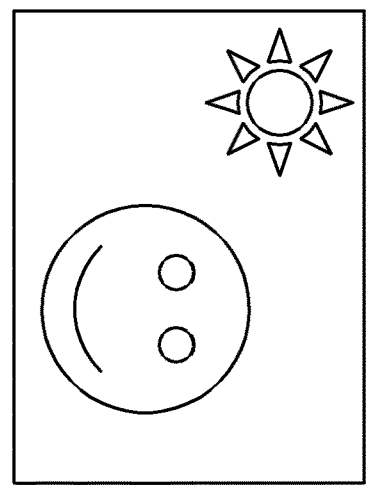
FIG. 3 is a diagram illustrating the processed image.

In addition, after the image processor 103 receives the temporary image, the image processor 103 can execute an image processing on the temporary image. The image processing includes at least one operation of color space conversion, luminance adjustment, resolution adjustment, noise cancellation, edge sharpening, interpolation, and contrast adjustment. Because the image processor 103 executing the image processing is obvious to those of ordinary skill in the art, further description thereof is omitted for simplicity. In addition, after executing the image processing on the temporary image, the image processor 103 generates a processed image (as shown in FIG. 3).

The image processor 103 can further flag the processed image being processed by the image processor 103 as a rotation status, wherein the rotation status is used for indicating a display direction of the processed image corresponding to a display direction of the input image. For example, some formats of image compression like JPEG are employed with exchangeable image file format (EXIF), wherein EXIF information can indicate a display direction of a JPEG image, and a display system can display the JPEG image in a desired display direction according to the EXIF information. But, the present invention is not limited to the processed image being the JPEG image, that is, the processed image can be an image with other image compression format. Therefore, after the image processor 103 flags the processed image as the rotation status, even if the processed image is generated by rotating the input image 90 degrees, the processed image still can be displayed in the display direction of the input image.

In addition, one of ordinary skill in the art should clearly realize functions of the rotation processor 101 and the image processor 103 through the above-mentioned corresponding descriptions of the rotation processor 101 and the image processor 103, so one of ordinary skill in the art can easily implement the rotation processor 101 and the image processor 103 through a field programmable gate array (FPGA) with the above-mentioned functions of the rotation processor 101 and the image processor 103, or an application-specific integrated circuit (ASIC) with the above-mentioned functions of the rotation processor 101 and the image processor 103, or a software module with the above-mentioned functions of the rotation processor 101 and the image processor 103, or an analog integrated circuit with the above-mentioned functions of the rotation processor 101 and the image processor 103. Therefore, further description of a corresponding structure of the rotation processor 101 and the image processor 103 is omitted for simplicity.

Figure 4:
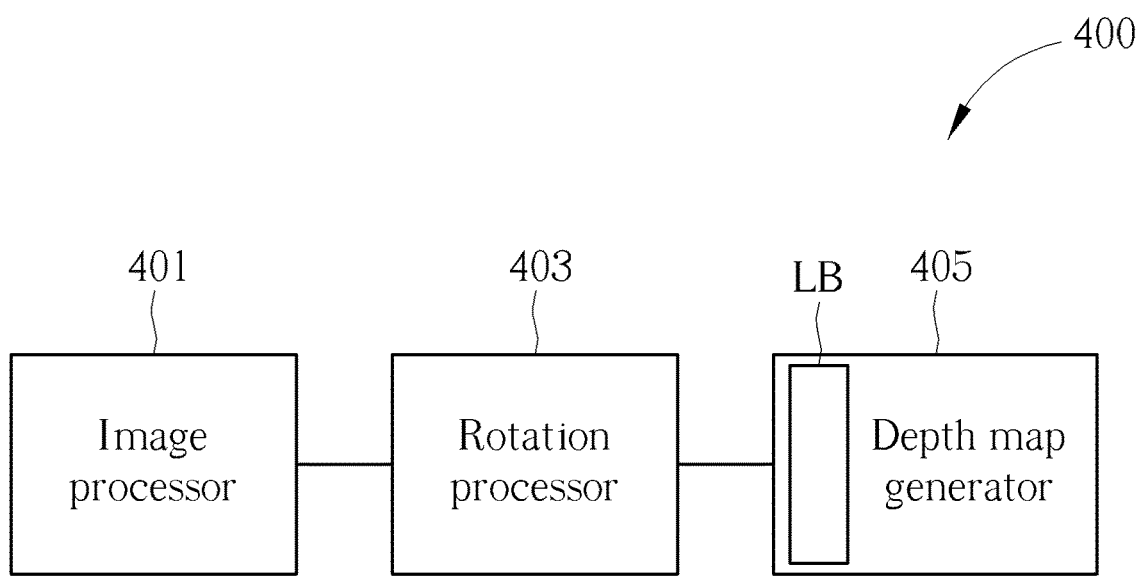
FIG. 4 is a diagram illustrating an image processing device according to a second embodiment of the present invention.
Figure 5:
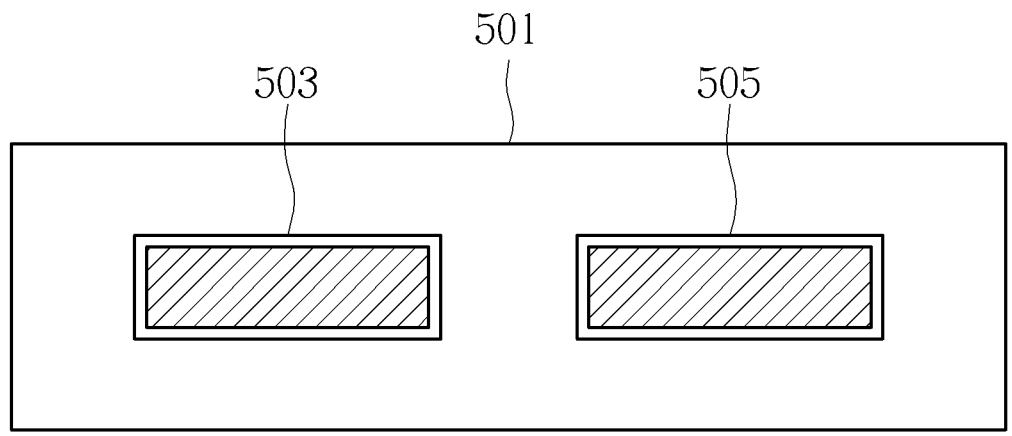
FIG. 5 is a diagram illustrating (a) two image capturers being conventionally place on a PCB and (b) the two image capturers being 90 degree place on the PCB.
Figure 5:
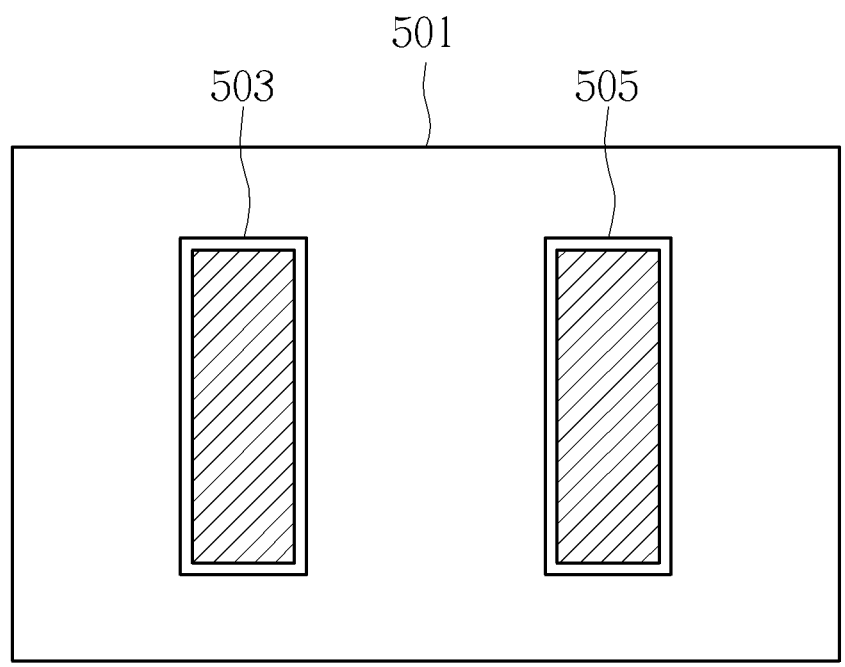

Please refer to FIG. 4. FIG. 4 is a diagram illustrating an image processing device 400 according to a second embodiment of the present invention. As shown in FIG. 4, the image processing device 400 includes an image processor 401, a rotation processor 403 and a depth map generator 405, wherein the rotation processor 403 is coupled to the image processor 401, the depth map generator 405 is coupled to the rotation processor 403, and depth map generator 405 includes at least one line buffer LB. The image processor 401 can utilize an input interface thereof (not shown in FIG. 4) to receive a left-eye input image and a right-eye input image, wherein the left-eye input image and the right-eye input image are captured by an image capturer group including two image capturers being 90 degree placed on a printed circuit board (PCB). Please refer to FIG. 5. FIG. 5 is a diagram illustrating (a) two image capturers 503, 505 being conventionally place on a PCB 501 and (b) the two image capturers 503, 505 being 90 degree place on the PCB 501. As shown in FIG. 5(a), horizontal directions (considered as width of an image) of the two image capturers 503, 505 are placed in a direction parallel to the PCB. Because the two image capturers 503, 505 are placed in the direction parallel to the PCB, after the left-eye input image and the right-eye input image are rotated 90 degree, an epipolar line of the left-eye input image and an epipolar line of the right-eye input image would become vertical to the left-eye input image and the right-eye input image. On the contrary, as shown in FIG. 5(b), horizontal directions (considered as width of an image) of the two image capturers 503, 505 are placed in a 90 degree direction, that is, in a direction vertical to the PCB. Because the two image capturers 503, 505 are placed in the direction vertical to the PCB, after the left-eye input image and the right-eye input image are rotated 90 degree, the epipolar line of the left-eye input image and the epipolar line of the right-eye input image would become parallel to the left-eye input image and the right-eye input image. Thus, the depth map generator 405 can determine a search direction to generate a depth map according to the epipolar line of the left-eye input image and the epipolar line of the right-eye input image. In addition, it is obvious to one of ordinary skill in the art that the depth map generator 405 determines the search direction to generate the depth map according to the epipolar line of the left-eye input image and the epipolar line of the right-eye input image, so further description thereof is also omitted for simplicity. In addition, the input interface can be referred to the above-mentioned descriptions of the input interface of the rotation processor 101, so further description thereof is omitted for simplicity. Moreover, the present invention is not limited to the left-eye input image and the right-eye input image captured by the image capturer group, that is, the image processor 401 can receive the left-eye input image and the right-eye input image via a storage device or other devices.

In addition, after the image processor 401 receives the left-eye input image and the right-eye input image, the image processor 401 can execute the image processing on the left-eye input image and the right-eye input image respectively. The image processing can be referred to the above-mentioned descriptions of the image processing of the image processor 103, so further description thereof is also omitted for simplicity. After executing the image processing on the left-eye input image and the right-eye input image respectively, the image processor 401 generates a left-eye processed image and a right-eye processed image.

The rotation processor 403 receives the left-eye processed image and the right-eye processed image and further utilizes a DRAM (not shown in FIG. 4) included in the rotation processor 403 to rotate the left-eye processed image and the right-eye processed image 90 degrees either clockwise or counterclockwise respectively. Meanwhile, because the left-eye processed image and the right-eye processed image correspond to generating of the depth map, the left-eye processed image and the right-eye processed image need to go through a dewarp function, wherein the dewarp function includes distortion correction and rotation correction, and is used for rectifying the left-eye processed image and the right-eye processed image for line alignment. Therefore, the rotation processor 403 further dewarps the left-eye processed image and the right-eye processed image according to the dewarp function and generates a left-eye temporary image and a right-eye temporary image accordingly. Because related operations of the dewarp function is obvious to those of ordinary skill in the art, further description thereof is omitted for simplicity. In addition, in one embodiment of the present invention, because both rotating the left-eye processed image and the right-eye processed image and dewarping the left-eye processed image and the right-eye processed image are related to matrix operations, rotating the left-eye processed image and the right-eye processed image and dewarping the left-eye processed image and the right-eye processed image can be integrated into a single step. For example, assume that the dewarp function utilize a matrix R to dewarp the left-eye processed image or the right-eye processed image. Then, the rotation processor 403 may further generate a matrix A for rotating the left-eye processed image and the right-eye processed image 90 degrees and calculate a final matrix FR by applying the matrix R and the matrix A to equation (1) shown as below, wherein an example of the counterclockwise 90 degrees rotation matrix A in a size of 3*3 may be $$\begin{bmatrix} 0 & -1 & 0 \\ 1 & 0 & 0 \\ 0 & 0 & 1 \end{bmatrix}.$$

FR=inverse(R)*A     (1)

Another embodiment of the present invention provides clockwise 90 degrees rotation matrix to substitute counterclockwise 90 degrees rotation matrix.

Therefore, the rotation processor 403 may utilize the final matrix FR to rotate and to dewarp the left-eye processed image and the right-eye processed image in the single step.

Figure 6:
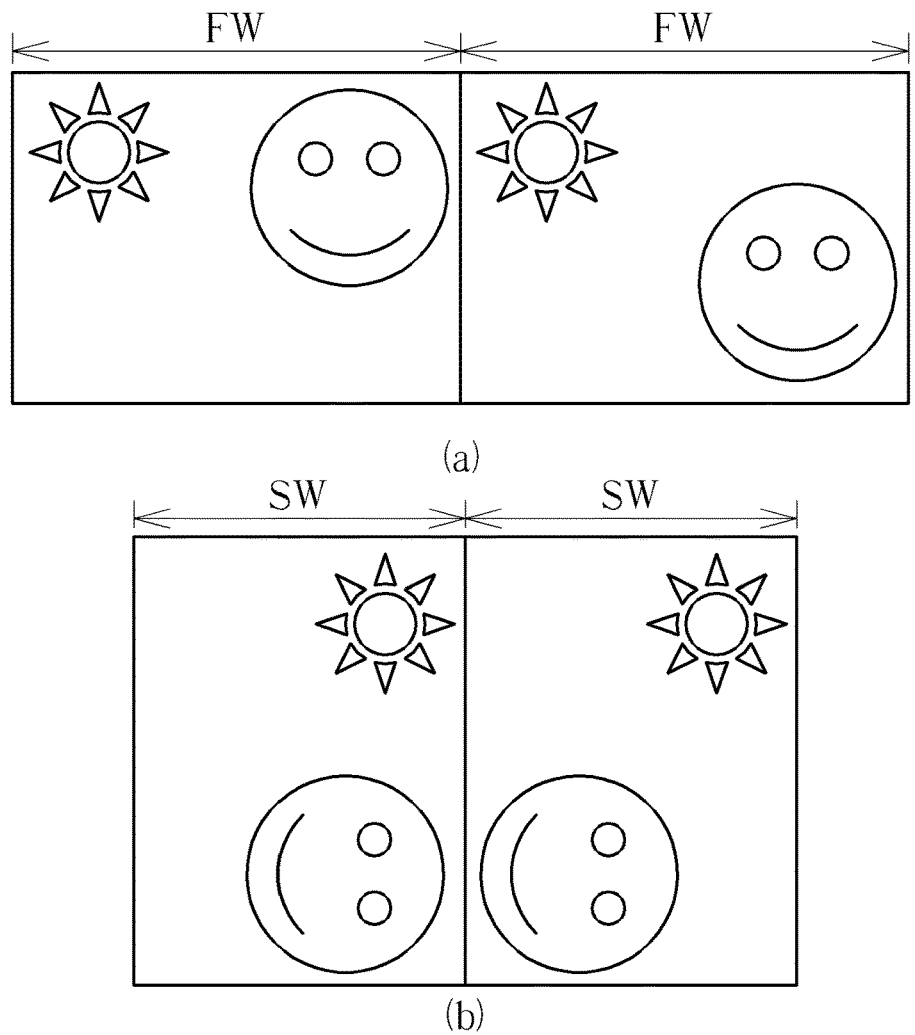
FIG. 6 is a diagram illustrating (a) the left-eye processed image and the right-eye processed image and (b) the left-eye temporary image and the right-eye temporary image.

Please refer to FIG. 6. FIG. 6 is a diagram illustrating (a) the left-eye processed image and the right-eye processed image and (b) the left-eye temporary image and the right-eye temporary image. As shown in FIG. 6(a), 5(b), each processed image of the left-eye processed image and the right-eye processed image has a first width FW, and each temporary image of the left-eye temporary image and the right-eye temporary image has a second width SW. A relationship between the first width FW and the second width SW can be referred to corresponding descriptions in FIG. 2, so further description thereof is omitted for simplicity.

In addition, as shown in FIG. 4, the at least one line buffer LB is an SRAM. Therefore, the depth map generator 405 has a predetermined image processing width W corresponding to a size of the at least one line buffer LB. However, the present invention is not limited to the at least one line buffer LB being the SRAM, that is, the at least one line buffer LB can be DRAM or other type of memories. A relationship between the at least one line buffer LB and the predetermined image processing width W, and a relationship among the predetermined image processing width W, the first width FW and the second width SW both can be referred to the above-mentioned descriptions of the image processor 103, so further description thereof is omitted for simplicity. Moreover, because the second width SW of the each temporary image is less than the predetermined image processing width W, the depth map generator 405 can receive the left-eye temporary image and the right-eye temporary image.

Figure 7:
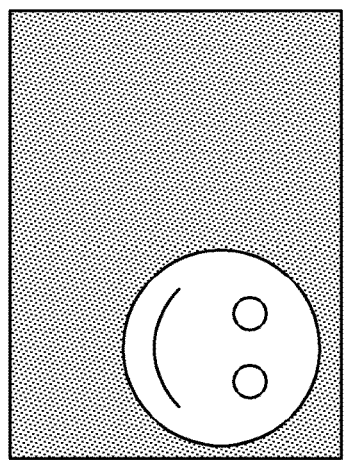
FIG. 7 is a diagram illustrating the depth map.

In addition, after the depth map generator 405 receives the left-eye temporary image and the right-eye temporary image, because there is a disparity between the left-eye temporary image and the right-eye temporary image, the depth map generator 405 can generate the depth map (as shown in FIG. 7) according to the left-eye temporary image, the right-eye temporary image and the disparity. It is obvious to those of ordinary skill in the art that the depth map generator 405 generates the depth map according to the left-eye temporary image, the right-eye temporary image and the disparity, so further description thereof is omitted for simplicity.

However, in another embodiment of the present invention, the image processing device 400 further includes a synchronization unit (not shown in FIG. 4), wherein the synchronization unit receives the left-eye temporary image and the right-eye temporary image and outputs synchronization signals to the each temporary image, respectively. For example, the synchronization unit can output a first synchronization signal to the left-eye temporary image and a corresponding second synchronization signal to the right-eye temporary image. In addition, a frequency of the first synchronization signal and a frequency of the corresponding second synchronization signal can be varied with a resolution of the left-eye temporary image and the right-eye temporary image, respectively, and the first synchronization signal and the corresponding second synchronization signal are the same or different. But, in another embodiment of the present invention, the left-eye temporary image and the right-eye temporary image can be divided into a plurality of image blocks according to scan lines of the left-eye temporary image and the right-eye temporary image, respectively, wherein the synchronization unit can output a synchronization signal to each image block of the plurality of image blocks of the left-eye temporary image, and the synchronization unit can also output a corresponding synchronization signal to a corresponding image block of the plurality of image blocks of the right-eye temporary image. But the present invention is not limited to the left-eye temporary image and the right-eye temporary image being divided into a plurality of image blocks according to the scan lines, that is, the left-eye temporary image and the right-eye temporary image can be divided into image frames or other ways for synchronization. After the synchronization unit outputs the first synchronization signal to the left-eye temporary image and the corresponding second synchronization signal to the right-eye temporary image, the depth map generator 405 can process the left-eye temporary image and the right-eye temporary image together to generate the depth map according to the first synchronization signal and the corresponding second synchronization signal. That is to say, the depth map generator 405 can generate the depth map according to each scan line of the left-eye temporary image and a corresponding scan line of the right-eye temporary image in turn.

In addition, the depth map generator 405 can further flag the depth map as a rotation status, wherein the rotation status is used for indicating a display direction of the depth map corresponding to display directions of the left-eye processed image and the right-eye processed image. The rotation status can be referred to the above-mentioned descriptions of the rotation status of the image processor 103, so further description thereof is omitted for simplicity.

In addition, in another embodiment of the present invention, after rotating the input image, or rotating the left-eye processed image and the right-eye processed image, at least one operation of image scaling and an image cropping can further be executed. For example, after rotating the input image, the input image can further be scaled down, so a width of the input image can be reduced again to meet the predetermined image processing width W. The at least one operation of image scaling and an image cropping can be executed as an independent function, or integrated into the dewarp function. In addition, the present invention is not limited to the at least one operation of image scaling and an image cropping being executed after rotating the input image, that is, the at least one operation of image scaling and an image cropping can be executed before rotating the input image.

In addition, one of ordinary skill in the art should clearly realize functions of the image processor 401, the rotation processor 403 and the depth map generator 405 through the above-mentioned corresponding descriptions of the image processor 401, the rotation processor 403 and the depth map generator 405, so one of ordinary skill in the art can easily implement the image processor 401, the rotation processor 403 and the depth map generator 405 through a field programmable gate array (FPGA) with the above-mentioned functions of the image processor 401, the rotation processor 403 and the depth map generator 405, or an application-specific integrated circuit (ASIC) with the above-mentioned functions of the image processor 401, the rotation processor 403 and the depth map generator 405, or a software module with the above-mentioned functions of the image processor 401, the rotation processor 403 and the depth map generator 405, or an analog integrated circuit with the above-mentioned functions of the image processor 401, the rotation processor 403 and the depth map generator 405. Therefore, further description of a corresponding structure of the image processor 401, the rotation processor 403 and the depth map generator 405 is omitted for simplicity.

In addition, please again refer to FIG. 1. In another embodiment of the present invention, after the rotation processor 101 receives the input image, the rotation processor 101 determines if the width of the input image is larger than the predetermined image processing width and obtains a determining result accordingly. If the determining result is the width of input image being larger than the predetermined image processing width, the rotation processor 101 rotates the input image 90 degrees either clockwise or counterclockwise to generate the temporary image, and if the determining result is the width of the input image being less than the predetermined image processing width, the rotation processor 101 directly outputs the input image to the image processor 103. In addition, because the rotation processor 101 may directly outputs the input image to the image processor 103, the rotation processor 101 also can generate the processed image according to the input image. Moreover, the above-mentioned operation of the determining result also can be applied to the rotation processor 403 and the depth map generator 405, and further description thereof is omitted for simplicity.

To sum up, the image processing device provided by the present invention receives at least one image, and utilizes a rotation processor included in the image processing device to generate at least one temporary image according to the at least one image, or according to at least one processed image further generated according to the at least one image, wherein at least one width of the at least one image is larger than a predetermined image processing width defined by the image processing device, and at least one width of the at least one temporary image is less than the predetermined image processing width. Therefore, compared to the prior art, the present invention can process the at least one image even if the at least one width of the at least one image is larger than the predetermined image processing width, and accordingly the restriction on the width of the input image of the image processing device can be improved.

Although the present invention has been illustrated and described with reference to the embodiments, it is to be understood that the invention is not to be limited to the disclosed embodiments, but on the contrary, is intended to cover various modifications and equivalent arrangements included within the spirit and scope of the appended claims.

What is claimed is:

1. An image processing device, comprising:
a rotation processor receiving a left-eye processed image and a right-eye processed image, and generating a left-eye temporary image and a right-eye temporary image according to the left-eye processed image and the right-eye processed image; and
a depth map generator coupled to the rotation processor and outputting a depth map according to the left-eye temporary image and the right-eye temporary image;
wherein the depth map generator has a predetermined image processing width, widths of the left-eye processed image and the right-eye processed image are larger than the predetermined image processing width respectively, and widths of the left-eye temporary image and the right-eye temporary image are less than the predetermined image processing width respectively, wherein the depth map generator is incapable of directly receiving the left-eye processed image and the right-eye processed image due to restriction of the predetermined image processing width.

2. The image processing device of claim 1, wherein the predetermined image processing width is decided by a size of at least one line buffer comprised in the depth map generator, and the at least one line buffer is a static random-access memory.

3. The image processing device of claim 1, further comprising:
an image processor coupled to the rotation processor and receiving a left-eye input image and a right-eye input image, and generating the left-eye processed image and the right-eye processed image according to the left-eye input image and the right-eye input image.

4. The image processing device of claim 3, wherein the left-eye input image and the right-eye input image are captured by at least two image capturers.

5. The image processing device of claim 1, wherein the rotation processor further comprises a dynamic random-access memory to dewarp and to rotate the left-eye processed image and the right-eye processed image 90 degrees respectively to generate the left-eye temporary image and the right-eye temporary image.

6. The image processing device of claim 5, wherein the depth map generator further flags the depth map as a rotation status, and the rotation status is used for indicating a display direction of the depth map corresponding to display directions of the left-eye processed image and the right-eye processed image.

\* \* \* \* \*